May 10, 1966  J. A. OSEKA  3,250,009

LINE HOLDER

Filed Jan. 7, 1964  2 Sheets-Sheet 1

INVENTOR.
JOHN A. OSEKA
BY
ATTORNEYS

May 10, 1966  J. A. OSEKA  3,250,009
LINE HOLDER

Filed Jan. 7, 1964  2 Sheets-Sheet 2

INVENTOR.
JOHN A. OSEKA
BY
ATTORNEYS

United States Patent Office 3,250,009
Patented May 10, 1966

1

3,250,009
LINE HOLDER
John A. Oseka, 3 East Ave., Elyria, Ohio
Filed Jan. 7, 1964, Ser. No. 336,210
8 Claims. (Cl. 33—86)

My invention relates to devices for holding flexible lines.

An object of my invention is to provide an improved holder for lines, such as carpenters' lines, bricklayers' lines, and other lines to be held straight for reference purposes.

Another object is provision of a holder for anchoring an end of a flexible line, cord, rope or the like.

Another object is the provision of an improved line holder which is readily adjustable for proper positioning of the line as a reference.

Another object is the provision of a line holder readily movable to desired position along a rod, nail, stud or the like supporting the holder.

Another object is the provision for the rapid and easy anchoring of the end portion of a line to a holder and obviating the need for tying or knotting the line.

Another object is the provision for a holder so constructed as to automatically orient the line relative to the axis of a rod, nail, stud or the like upon which the holder is anchored.

Another object is the provision for a unique construction in a line holder giving results not heretofore obtainable in a novel and useful manner.

Another object is the provision of a line holder which is readily adaptable for use in holding and aligning flexible lines of various types and which includes ready means for securing the line to the holder.

Other objects and a fuller understanding of the invention may be had by referring to the following description and claims, taken in conjunction with the accompanying drawings in which:

Figure 1:
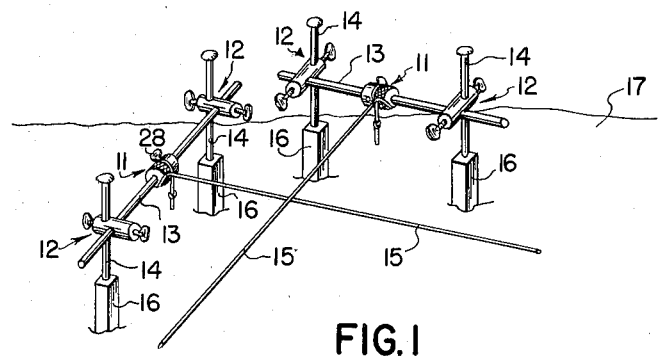
FIGURE 1 is a perspective view of a use of my improved line holder for the purpose of securing the ends of lines at the corner of a building foundation for holding the lines in proper reference location for such a foundation.

My line holder is denoted generally by the reference character 11. It is preferably a metal body of generally cylindrical form. Extending axially through the body of the holder 11 is a bore or opening 26 having relatively smooth walls. This bore or opening 26 is adapted to accommodate a rod, nail, stud or similar longitudinal member therein in such manner that the body 11 may slide longitudinally thereof and also rotate thereon. In FIGURE 1 there are two holders 11 each shown slidably mounted on a horizontally disposed rod 13. The fit of the rod 13 in the axial opening 26 is snug but permits slidable movement of the holders along the rod and also permits rotation of the holder about the axis of the rod 13. Similarly the holder 11 may be mounted on a nail, such as a long gutter nail, spike, stud or other round elongated member. In the particular arrangement shown in FIGURE 1, the rods 13 are carried by a pair of rod clamps 12, each of which in turn is supported on a nail or spike 14. The clamps 12 are adjustable along the length of the spike 14 and may be clamped to that position by a set screw 35 which firmly engages a side of the spike 14. The rod 13 is also adjustable relative to the clamp 12. The rod 13 extends through a transverse opening in the clamp 12 and a set screw 36 may be turned to firmly engage the side of the rod 13 within the clamp 12.

It is thus seen that the supporting rods 13 in FIGURE 1 may be raised or lowered and held in desired elevation by means of the respective clamps 12. The spikes 14 are driven in the ends of the stakes 16 extending upwardly from the ground or earth 17. By having the rods 13 at substantially right angles to each other, lines may be supported at right angles to each other at the corner of a building foundation.

Figure 2:
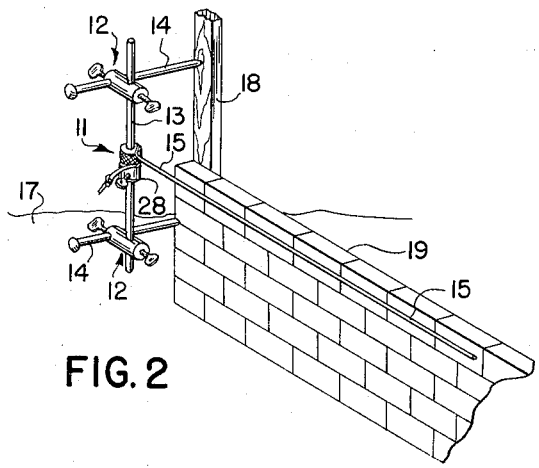
FIGURE 2 is a perspective view of another related use showing my improved line holder for securing the end of the line running along as a reference for a brick wall being constructed.

In FIGURE 2, the same line holder 11 is shown mounted on a vertically disposed rod 13 which in turn is held in position by clamps 12 carried by two vertically spaced and horizontally extending spikes 14. These spikes 14 are driven into and secured in position in a corner upright plank or wooden member 18. In this use of my holder a line is held relative to a brick wall 19 being constructed and the holder 11 may be changed as to its vertical elevation by being moved along the rod 13 and secured there by a set screw 28, extending into the holder 11 to engage the side of the rod 13 within the holder. Similarly in the arrangement of FIGURE 1, the loosening of the set screws 28 on the respective holders permits the holders to be moved relative to the supporting rods 13 and upon the tightening of the set screws 28, the holders are fixedly secured to the respective rods. The set screws 28 are of the type having a thumb-engaging portion for ready turning thereof by hand.

Figure 4:
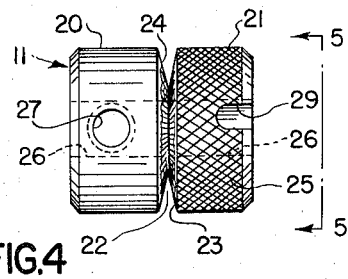
FIGURE 4 is a side elevational view of the preferred form of my line holder.
Figure 5:
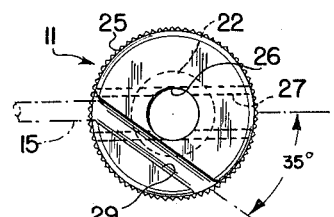
FIGURE 5 is an end view looking in the direction of the arrows 5—5 of FIGURE 4.

Details of the preferred form of line holder are shown in FIGURES 4 and 5. Intermediate the axially spaced ends of the holder 11 is an annular groove 22. This groove 22 extends from the outer wall of the holder 11 toward the axis thereof but does not extend into the axially extending opening 26. The groove generally divides the holder 11 into portions 20 and 21, the portion 21 having a knurled outer surface 25 for convenience in manually adjusting the position of the holder.

The annular groove 22 has a V-shaped cross-section in that it has opposite sides 23 and 24 inclined toward each other as they extend radially inward. The surface of the sides 23 and 24 is non-smooth or uneven and in the preferred form this is obtained by knurling the surface of the sides 23 and 24. Extending radially inward of the portion 20 is a threaded hole 27 which threadably receives a set screw 28. For convenience of fabrication, the threaded hole 27 extends clear across the holder but it is only necessary that it extend into the axial opening 26 so that the engaging end of the set screw 28 may engage and lock with a rod or other member within the axial opening 26 upon turning down of the set screw.

At one end of the holder body 11 there is a cross-groove 29 which extends across the end face of the body 11 from one side to the other. This cross-groove 29 is disposed to one side of the axial opening 26 so as not to interfere with a rod, nail or the like extending through the axial opening 26. The cross-groove 29 has one end on one side of the holder 11 and another end on an opposite side of the holder 11. As seen in FIGURE 5, one end of the cross-groove 29 is displaced about 35 degrees from a line running diametrically from the other end of the cross-groove through the axis of the body. In other words, the axis of the cross-groove 29 is approximately 35 degrees from a line running diametrically across the body 11 through th axis thereof from the other end of the cross-groove 29.

In the use of my improved holder, a flexible line such as a cord, string, rope or the like is placed within the cross-groove 29 and the main body of the line 15 is stretched along in a reference location. The other end of the line is manually pulled so as to put tension on the line. The pulling of the main portion of the line away from the rod 13 or other support upon which the holder is mounted tends to cause the holder to rotate on its axis so that the line 15 extends away from the holder in a direction radially from the axis of the holder. The line 15 within the cross-groove 29 so engages the walls of the cross-groove as to rotate the holder body 11 on its axis until the line 15 extending outwardly from the cross-groove 29 is aligned directly radial of the holder body 11. Thus assuming that the rod 13 upon which the holder 11 is mounted has its axis correctly located, then the line 15 stretched away from the holder 11 will be aligned as though passing directly through the axis of the holder. There is thus an automatic self-adjusting of the holder so that the line stretching away from the holder is not to one side or the other of the axis of the holder but is disposed along a true straight line transversing the axis of the rod 13 upon which the holder is mounted. Of course, if the holded is mounted upon a nail, spike, stud or other elongated support, there is a similar self-adjusting of the line extending from the holder relative to the axis of such nail, spike, stud or other elongated support.

Figure 3:
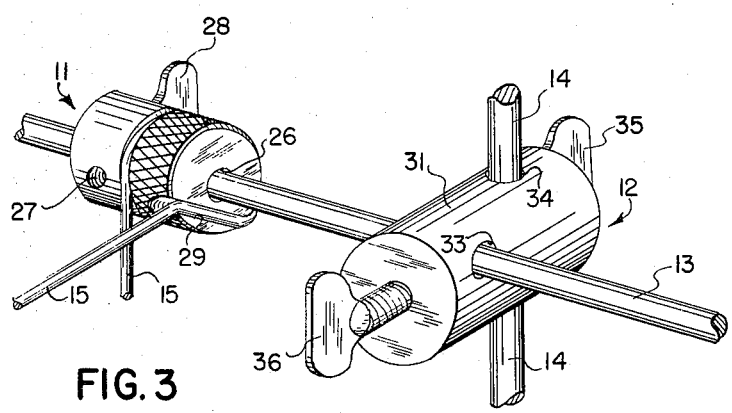
FIGURE 3 is an enlarged perspective view of my line holder mounted upon a rod along which the holder is adjustably movable.

After the holder 11 has rotated under the tension of the line 15, such as to the position shown in FIGURE 3, the free end of the line is wrapped around or turned so as to be placed in the annular groove 22. By reason of the wedge-shape of the sides of the groove 22 and the non-smooth surface provided by the knurling of the sides, the line 15 placed within the groove 22 is wedgingly and frictionally engaged so as to resist slipping therefrom. Thus the line may be merely placed so as to extend only partially around the holder 11 and thus to be in an arc within the groove 22 and by reason of the firm wedging grip of the line by the sides of the groove, the line is secured without tying or knotting the line. The line may be quickly and readily unsecured or loosened by merely lifting it out of the annular groove 22 so as to be removed from the gripping action of the sides of the groove. When the holder is in its proper rotative position and also its longitudinal position along the supporting rod 13, the handle of the set screw 28 is turned in the threaded hole 27 so as to firmly abut the inner end of the set screw 28 against the side of the rod 13 and thus to firmly lock the holder in position relative to the rod 13. It is thus seen that the holder construction is such that a line may be quickly and readily located for reference purposes and that it automatically adjusts its position so as to extend directly radially out from the axis of the elongated support within the axial opening 26 in the holder. The position of the holder when thus assumed may be fixed by means of the set screw 28.

Figure 6:
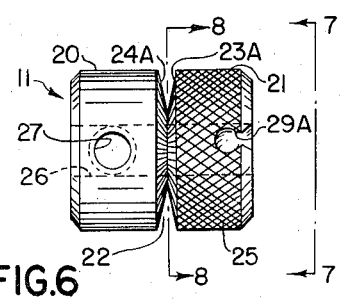
FIGURE 6 is a side elevational view of a modified form of my line holder.
Figure 7:
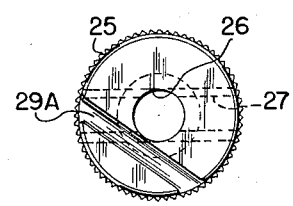
FIGURE 7 is an end view of the line holder shown in FIGURE 6 and looking in the direction of the arrows 7—7 of FIGURE 6.

In FIGURE 6, the cross-groove is modified so as to have an overhanging edge and as thus shown is indicated by the reference character 29A. The positions of the walls of the groove 29A being in the form illustrated in FIGURES 6 and 7 is so that the line within the cross-groove tends to avoid escaping from the cross-groove if the line is pulled at too sharp an angle from its position when extending directly radial of the axis of the holder. The overhanging edges of the groove 29A thus tend to restrain a line therein against being angularly pulled therefrom.

Also in the modification of FIGURES 6 and 7, the surfaces of the sides of the annular groove 22 are modified so as to have radially ribbed or serrated sides 23A and 24A. The serrated or ribbed surfaces 23A and 24A also tend to frictionally engage a line wedged within the groove 22.

Figure 9:
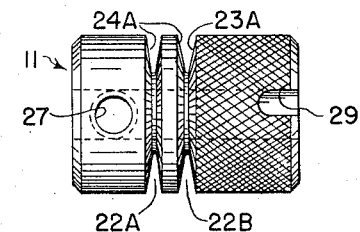
FIGURE 9 is a side elevational view of another modified form of my line holder.
Figure 8:
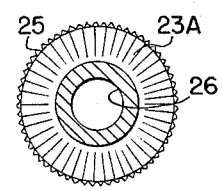
FIGURE 8 is a cross-sectional view taken through the line 8—8 of FIGURE 6.

In the modification illustrated in FIGURE 9, there are two annular grooves denoted by the reference characters 22A and 22B. These annular grooves 22A and 22B may be parallel to each other or may be parts of a spiral groove formed in the holder body 11. A more firm securement is given to a line by having the double groove so that the line may be wrapped around the holder more than once and thus to have more than one lap of the line wedgingly secured in the groove.

Figure 10:
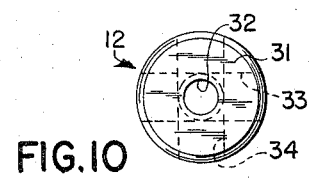
FIGURE 10 is an end view of a rod clamp utilized in association with my line holder.
Figure 11:
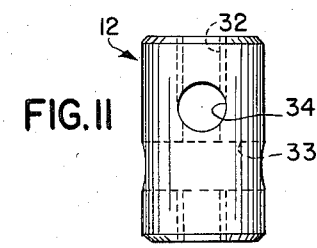
FIGURE 11 is a side view of the rod clamp shown in FIGURE 10.

In FIGURES 9 and 10 the construction of the rod clamp 12 is illustrated. An axial extending threaded opening 32 is provided in the cylindrical body of the clamp 12. A set screw 35 may be threadably engaged in one end of the threaded opening 32 and a set screw 36 may be threadably engaged in the other end of the threaded opening 32. As seen in FIGURE 3, one set screw 35 is adapted to engage a nail or stud 14 and the other set screw 36 is adapted to engage a rod 13.

The body of the clamp 12 also has a transverse opening 34 through which the nail, spike or stud 14 extends and has another transverse opening 33 at right angles to the transverse opening 34 for accommodating the rod 13. The openings 33 and 34 are spaced from each other and the axes thereof are in planes normal to each other as illustrated.

It is found from the use of my improved line holder that it is convenient, accurate, and efficient in use. It may be adapted for many uses in building construction and for other purposes wherein a line is to be held, as for example, in the holding of the end of a clothesline, in the holding of a line supporting a plumb bob, and for many other uses which will be apparent to those knowing the need and requirement for such holders.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A line holder comprising a body having an axially disposed opening extending therethrough for accommodating therein a rod, nail, stud or the like, said body having an annular groove located intermediate the ends thereof and extending around the body from the outer wall thereof toward said opening, the sides of said annular groove being inclined toward each other as they extend toward said opening, said sides being non-smooth to provide good frictional engagement with a line disposed in said annular groove, a cross-groove disposed transversely of said body and extending inwardly of the body from an end wall thereof, said cross-groove having an axis spaced from the axis of said opening and disposed in a plane at an angle to the axis of said opening, and releasable clamping means carried by said body for clamping said body to a rod, nail, stud or the like accommodated in said opening.

2. A line holder comprising a generally cylindrical body having an opening extending axially therethrough for accommodating therein a rod, nail, stud, or the like whereby the body is revolvable and reciprocal on said rod, nail, stud or the like, said body at a location intermediate the ends thereof having a V-shaped annular groove extending therearound adapted to hold a line wedged therein, said body having a cross-groove extending transversely of an end wall of said body and spaced radially of the axis of said body, said body having a threaded hole extending from a side thereof to said opening, and a threaded member threadably mounted in said hole for releasably engaging a said rod, nail, stud or the like accommodated in said opening for securing the body to the same at selected locations, said cross-groove being adapted to accommodate a line placed therein and upon a portion of the line extending from one end of the cross-groove being pulled away from the axis of the body to tend to cause the body to rotate on its axis until the said portion of the line is extending radially from the body axis, said annular groove being adapted to receive another portion of said line extending from the opposite end of the cross-groove to wedgingly grip the line.

3. A line holder comprising a body having an opening extending therethrough for accommodating therein a supporting member upon which the body may rotate and longitudinally slide, said body having a hole extending from a side thereof to said opening, a securing member extending into said hole to engage the side of a said supporting member in the opening, said securing member being movable relative to the body to lock the body to the supporting member and to release the body from the supporting member for rotative and longitudinal movement of the body relative to the supporting member, said body having a groove extending across an end thereof and having a first end and a second end, said groove being disposed in a plane generally normal to a plane through the axis of said opening, said body having annular groove means extending therearound and extending from the outer wall of the body toward the axis of said opening, said annular groove means having side walls inclined inwardly toward each other and of uneven surface texture for wedgingly and frictionally gripping a line disposed in said annular groove means in a curve about the axis of said opening, the arrangement providing that tension on the portion of a line extending from the first end of said cross-groove tends to rotate the body to align said tensioning portion radially of the axis of said opening and the portion of said line extending from the second end of said cross-groove may be disposed in a curve within said annular groove means to be wedgingly and frictionally gripped by the side walls thereof.

4. A line holder adapted to hold a line such as a cord, rope or string in direct radial alignment with an elongated round supporting member such as a rod, nail, or stud, comprising a body, an outer wall and opposite end walls, said body having a round opening extending axially therethrough for complementarily receiving a said supporting member and permitting the body to rotate and to move longitudinally relative to the supporting member, said body having a cross-groove in one of said end walls and extending across from side to side of the body and disposed aside of said round opening to avoid a supporting member therein, said body having line-wedging groove of V-shaped cross-section provided in the outer wall thereof and extending toward the axis of the body, the said body having a threaded hole extending from said outer wall to said round opening, and a set screw threadably engaged in said threaded hole and having an end adapted to engage a supporting member therein for locking the body to the supporting member, the said body upon being free to rotate on a supporting member in said opening and having a line disposed in said cross-groove and extending under tension from the cross-groove radially away from said supporting member being rotated by the line to dispose the extended line radially of the axis of said supporting member whereby the reference provided by the extended line bisects the said axis, the body upon being positioned on the supporting member being lockable thereto by said set screw and the non-extended portion of the line being anchorable to the body by being wedged in said line-wedging groove of the body.

5. A line holder adapted to hold a line such as a cord, rope or string in direct radial alignment with an elongated round supporting member such as a rod, nail, or stud, comprising a generally cylindrical body having a round opening extending axially therethrough for complementarily receiving a said supporting member to rotate and to move longitudinally relative to the supporting member, said body having a cross-groove in an end wall thereof extending from side to side of the body, the axis of said cross-groove being at an acute angle to a line running diametrically through the body from an end of the groove through the axis of the body, said body having an annular groove in the cylindrical wall thereof, said annular groove having sides inclined toward each other as they extend inwardly toward the axis of said body, the side of said annular groove providing frictional engagement with a line wedged in said annular groove to secure the line to said body, the arrangement of said grooves in said body being that upon a line being placed in said cross-groove and the portion extending from one end of the cross-groove being tensioned the body tends to rotate on the axis of the supporting member in said opening to where the said extended portion is disposed radially of the said supporting member and the portion of the line extending from the other end of the cross-groove being pulled about the body and wedged into the said annular groove is secured to said body.

6. A line holder as defined in claim 5 and in which said cross-groove is disposed as a cord to the generally circular form of the end wall of said generally cylindrical body and to one side of said axially extending round opening to avoid a supporting member received therein.

7. A line holder as defined in claim 6 and in which said inclined sides of the annular groove are roughened as by knurling, serrating or the like to increase the frictional engagement between the said sides and a line in said annular groove.

8. A line holder as defined in claim 5 and including a set screw threadably engaged to said body and directed to engage a supporting member in said axially aligned opening for locking the body to a said supporting member.

References Cited by the Examiner

UNITED STATES PATENTS

| | | | |
|---|---|---|---|
| 83,075 | 10/1868 | McMaster | 24—127 |
| 279,274 | 6/1883 | Patterson. | |
| 550,140 | 11/1895 | Smith | 24—129 X |
| 598,441 | 2/1898 | Sargent | 24—129 |
| 1,213,011 | 1/1917 | Ragotzky | 24—129 X |
| 1,234,282 | 7/1917 | Butler | 33—85 |
| 1,470,261 | 10/1923 | Harrington | 24—130 X |

FOREIGN PATENTS 662,028 11/1951 Great Britain.

ISAAC LISANN, *Primary Examiner.*